Feb. 16, 1937.   P. PETERSEN   2,070,976
FRUIT PRONGS
Filed June 9, 1936
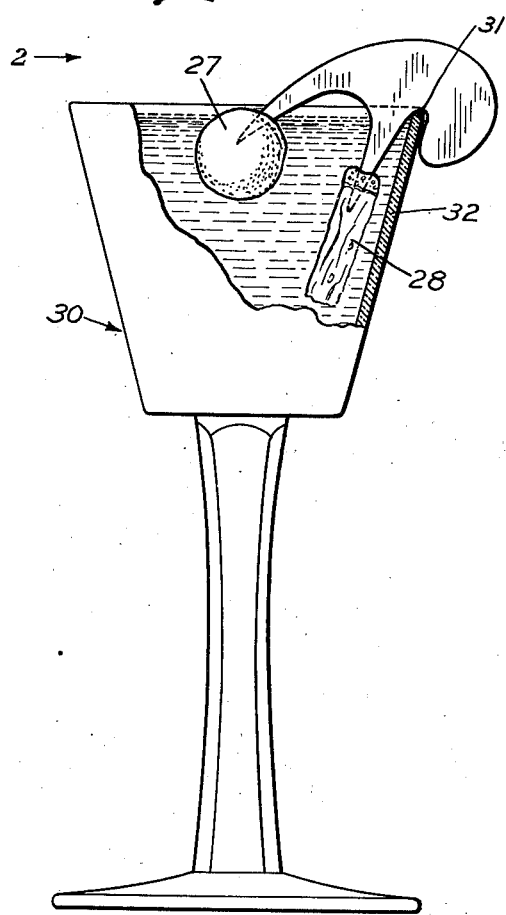
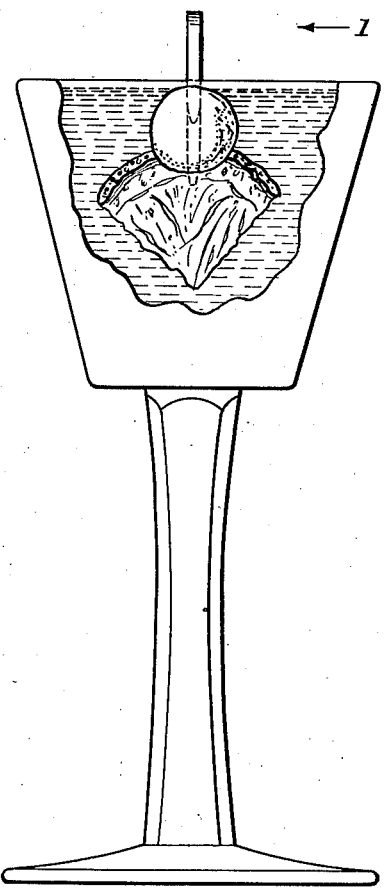
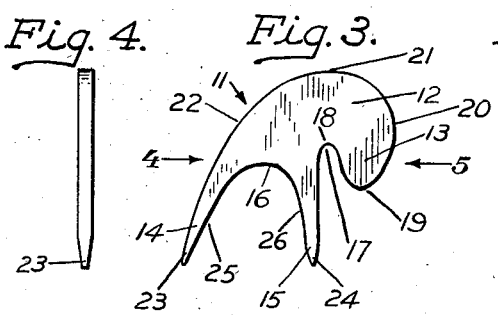
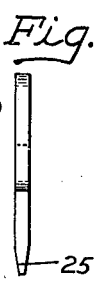
Inventor
Peter Petersen
by Hazard and Miller
Attorneys Patented Feb. 16, 1937

2,070,976

UNITED STATES PATENT OFFICE 2,070,976

FRUIT PRONGS

Peter Petersen, Los Angeles, Calif., assignor of one-half to Thomas G. Miller, Venice, Calif.

Application June 9, 1936, Serial No. 84,285

7 Claims. (Cl. 30—5)

My invention relates to fruit prongs by which small fruit or segments of a fruit may be attached and supported from the rim of a glass.

My invention is principally designed for use in serving cocktails or similar drinks to provide a device by which small fruit such as cherries, small onions, olives and the like, together with segments of larger fruit, such as of oranges or the like, may be attached to the prongs and the prong device with the fruit hooked or supported from the rim of the glass, the device with the prongs also forming a finger grip device by which the fruit may be removed from the cocktail and supported in a convenient manner for eating such fruit. Another feature of my invention is that the device is quite inexpensive and thus may be discarded after use.

Considered in further detail, my invention is preferably made from a thin piece of wood, this being provided with one or more sharpened prongs to which the fruit is impaled, two prongs being satisfactory. A notch is formed in the under edge at the outside portion of the prongs and forms with the outside part of the device a hook by which the implement may be caught on the rim of a glass with the prongs having the fruit thereon extending towards the center of the glass so that the fruit is immersed in the liquor. The portion of the device projecting outside the rim of the glass and above the glass forms a convenient finger grip for use when attaching the device to the cocktail glass and for removing and eating the fruit.

My invention is illustrated in connection with the accompanying drawing, in which:

Figure 1 is an elevation taken in the direction of the arrow 1 of Figure 2 of my invention applied to a cocktail glass, the glass being broken away and illustrating a small fruit and a segment of an orange attached to the points or prongs of the device, this being supported on the rim of the glass.

Figure 2 is an edge elevation taken in the direction of the arrow 2 of Figure 1.

Figure 3 is a side elevation of the device by itself.

Figure 4 is an inside edge elevation taken in the direction of the arrow 4 of Figure 3.

Figure 5 is an outside edge elevation taken in the direction of the arrow 5 of Figure 3.

The body structure of my fruit prongs designated by the numeral 11, is preferably made from a thin sheet, strip or plate of wood and has an upper part 12 forming a finger grip portion together with the outside depending part 13. There is an inside prong 14 and an outside prong 15 separated by a concave curved section 16. Between the outside prong 15 and the outer finger grip section 13 there is a deep notch 17 having a concave curve 18 at its apex. It is preferable to form the device with a relatively sharp convex curve 19 on the outside portion of the notch. There is a somewhat circular convex edge 20 on the outside edge of the outer finger grip section 13. This curve extends somewhat above the upper finger grip portion 12 as indicated at 21 and develops with a pronounced spiral at the inside portion 22 which terminates in the prong 21, such prong having a sharp point 23. The other prong 15 also has a sharp point 24. To give the device more or less symmetry, the edge 25 on one side of the prong 14 and the edge 26 on one side of the prong 15 have nearly the same curve only reversed. The points of the prongs are sufficiently sharp to readily penetrate through the skin of small fruit and impale such fruit. The inner prong 14 is designed especially for engaging small fruit such as indicated at 27, Figures 1 and 2. The outer prong 15 is designed more for engaging a slice of fruit such as orange, indicated at 28 in which the prong penetrates the skin and if desired, partly into the pulp of the fruit.

In using the device, it is intended to be attached to a cocktail glass indicated at 30. The notch 17 engages the rim 31 of the glass. This notch therefore, forms a hook for supporting the device with the fruit impaled on the prongs on the edge of the glass. The weight of the fruit manifestly causes the device to slightly tilt so that the outermost fruit, that is, in the illustration the orange slice, contacts the side wall 32 of the glass. Due to the weight of the fruit impaled on the prongs, the device is supported on the glass with the finger grip portion 12 and the outside finger grip part 13 upright, that is, the thin piece of wood or other material forming the device occupies a vertical plane. Manifestly the device with the fruit impaled on the prongs may readily be attached to the cocktail glass with the fruit immersed in the liquor and the finger grip portion affords a convenient device for removing the fruit for eating.

Various changes may be made in the details of the construction without departing from the spirit or scope of the invention as defined by the appended claims.

I claim:

1. A device as described formed of a rigid flat piece of sheet material having a notch formed on its under edge and a finger grip portion above and on the outside of the notch, an inclined extension from the finger grip portion having a prong for impaling fruit whereby the notch and the portion adjacent thereto forms a hook for securing the device to the rim of the glass with the prong towards the center of the glass whereby fruit impaled on the prong may be immersed in liquor in the glass, said device being readily removable from the glass to permit eating of the fruit impaled on the prong the said flat rigid piece of sheet material with the finger grip and the prong when supported by the hook on the rim of a glass being adapted to occupy a vertical plane.

2. A device as claimed in claim 1, a second prong positioned adjacent the notch and in the same plane as the first prong and the finger grip portion of the device, the second prong being adapted for impaling a piece of fruit whereby such latter piece of fruit may occupy a position adjacent the wall of the glass.

3. A device as described formed of rigid thin sheet material having a notch on its under edge and a side and upper edge having a convex curve, said curve being somewhat of a spiral with the shorter radii of the spiral being adjacent the notch, the outer end of the spiral having a first prong formed adjacent thereto, the under side of the first prong havng an edge extending towards the notch, the portion above the notch and on the outside of the notch forming a finger grip, the notch with the said upper and outer portion forming a hook for attaching the device to the rim of a glass whereby a piece of fruit impaled on the prong may be immersed in liquor in the glass the said flat rigid piece of sheet material with the finger grip and the prong when supported by the hook on the rim of a glass being adapted to occupy a vertical plane.

4. A device as claimed in claim 3, a second prong extending downwardly from one side of the notch, the center line of the prongs diverging, the second prong being adapted for impaling a piece of fruit whereby such latter piece of fruit may be adjacent the side wall of a glass and the fruit on the first prong adjacent the center axial line of the glass, the said prongs and the finger grip portion being in the same plane.

5. A device as described formed of a rigid thin flat piece of sheet material having an upwardly extending notch formed on its under edge, a finger grip portion extending downwardly on the outside of the notch and upwardly above the notch, an extension from the finger grip portion above the notch having a downward curve and forming a prong for impaling fruit, the notch being adapted for securing the device on the rim of a glass with the prong extending into a liquor in the glass whereby the flat rigid piece with the integral finger grip portions and prong occupy a vertical plane.

6. A device as described and claimed in claim 5, a second prong positioned at one side of the notch opposite the finger grip portion outside of the notch, the second prong being adapted for impaling fruit, the two prongs being in the same plane, the fruit on the second prong being adapted to be positioned contiguous to the side of a glass.

7. A device as described formed of a rigid flat piece of thin sheet material having a notch extending upwardly from its lower edge, an outwardly curved portion outside of the notch and extending above the notch forming a finger grip, a prong contiguous to the notch and extending downwardly below the finger grip portion on the outside of the notch and adapted for impaling fruit, such fruit being positioned contiguous to the inside of a glass for immersion in a liquor when the notch is engaged over the rim of a glass, the said piece of sheet material with the finger grip portion and the prong being adapted when supported on the rim of a glass to occupy a vertical plane.

PETER PETERSEN.